United States Patent [19]

Armando

[11] Patent Number: 5,285,579
[45] Date of Patent: Feb. 15, 1994

[54] TRIDIMENSIONAL MULTIFUNCTION PLOTTER

[75] Inventor: Corsi Armando, Piacenza, Italy

[73] Assignee: Jobs S.p.A., Piacenza, Italy

[21] Appl. No.: 656,239

[22] Filed: Feb. 14, 1991

[30] Foreign Application Priority Data

Feb. 22, 1990 [IT] Italy .................... 44804 A/90

[51] Int. Cl.$^5$ .............. G05B 19/403; B23Q 15/00; G06F 15/46; G01B 7/03
[52] U.S. Cl. ........................ 33/18.1; 33/1 M; 33/26; 33/504; 364/474.24
[58] Field of Search ............ 33/25.1, 1 M, 18.1, 33/25.2, 26, 32.3, 32.4, 503, 504, 505; 364/474.24, 474.22

[56] References Cited

U.S. PATENT DOCUMENTS

| | | | |
|---|---|---|---|
| 4,621,926 | 11/1986 | Merry et al. | 33/503 |
| 4,631,834 | 12/1986 | Hayashi et al. | 33/503 |
| 4,910,446 | 3/1990 | McMurtry et al. | 33/1 M |
| 4,945,501 | 6/1990 | Bell et al. | 33/505 |
| 5,068,972 | 12/1991 | Herzog et al. | 33/1 M |
| 5,093,672 | 3/1992 | Gascuel et al. | 33/18.1 |
| 5,121,329 | 6/1992 | Crump | 364/474.24 |
| 5,177,689 | 1/1993 | Kinasi et al. | 364/474.24 |

FOREIGN PATENT DOCUMENTS 1-58505 6/1989 Japan ................ 364/474.24

*Primary Examiner*—William A. Cuchlinski, Jr.
*Assistant Examiner*—C. W. Fulton
*Attorney, Agent, or Firm*—Notaro & Michalos

[57] ABSTRACT

The invention relates to a tridimensional multifunction plotter, comprising a support of a tool which can move with a high precision following a predetermined tridimensional surface.

The mobile part of the machine comprises a multifunction head to which several devices like laser distance measuring devices, digital and analogic probes for the surveying and digitizing of a bidimensional and/or tridimensional surface, or tools of various kinds for making a tridimensional model starting from a surface defined through a CAD system.

A hardware-software subsystem is provided, parallel connected with the CPU of the machine, to obtain an integrated system which allows a direct connection of the machine with a CAD system so allowing the operator to input the various working parameters directly to the plotter, without the need of an external processing the data file generated by the CAM system, to convert it into a file compatible with the numeric controls of the machine.

3 Claims, 12 Drawing Sheets

TRIDIMENSIONAL MULTIFUNCTION PLOTTER

FIELD AND BACKGROUND OF THE INVENTION

This invention relates to a tridimensional plotter, that is to say a machine in which a tool support, in particular an operating head on which tools of different types can be mounted, can move following a tridimensional surface defined through a CAD system or detected and digitized directly by the machine through proper instruments which are also provided for being mounted on the abovementioned mobile support.

SUMMARY OF THE INVENTION

The control software of the machine includes also a CAM system and a post-processor, so as to allow a direct connection between the plotter and a CAD system, to avoid the need of devices which carry out the intermediate processings of the surface file generated by the latter.

This characteristic makes the machine use very simple and easy even for not very expert personnel.

In accordance with the invention, the plotter is a system able to carry out many machinings, such as drawings, surveys, scannings, digitizings, millings, etc. and is very useful in engineering and design offices where, after drawing a structure, it is necessary to make a model in real scale to check both the aspect and to perform tests, carry out modifications, etc.

For example this need is found in several design offices, such as offices where complicated surfaces like cars bodyworks are studied and designed.

In cases such as that given in the example it is necessary, once the drawing is ready, to make a rapid and cheap model in order to see how it really is and then, after making all the necessary modifications, bring them to the CAD surface for the subsequent production and die manufacturing phases, etc.

It is clear that in situations/like the aforementioned one using the traditional instruments has serious problems. As a matter of fact it is very difficult to carry out with accuracy the drawing of a model to which a series of modifications has been carried out manually.

There are already several appliances used to carry out the single above mentioned operations, either one or the other.

For example, there are devices capable of scanning surfaces in which a probe moves along the surface taking the coordinates of each point and giving a series of signals allowing the consequent mathematization and computer data processing.

Moreover, there are machines, e.g. the bidimensional plotters, capable of reproducing the drawing and machine tools to reproduce the model starting from the drawing or better from a file containing all the data relevant to this drawing once it has been properly processed.

All these devices are not suitable for the use in a technical office because of their often very big dimensions, and because it would be necessary to have different machines available and their use is rather complicated.

In compliance with the known techniques a CAD-CAM system able to create a mathematical model of the tridimensional surface is necessary as well as a system able to process this mathematical model by means of a milling processor; all that because the CAD-CAM systems create tool paths having formats independent of the machine's format.

In order to better understand the process used for the models realization with the means now available, we could make a reference to FIG. 1, where the blocks scheme of the processing and development process of the data generated by the CAD system is given in order to get the realization of the 3D model. The CAD system generates a surface file which shall be input or sent to a CAM system; some undelayable inputs, e.g. tool profile and dimensional tolerances, shall then be given to this CAM system.

On the basis of these data the CAM system processes, starting from the surface file, a series of tool paths or "CL file". po However, this CL file is not compatible with the format of the CNC file and therefore it is necessary for further processing by means of a second processor or "post-processor".

It is also necessary to supply the system with other guidelines for the programmation at the tool pivot point, e.g. tool length, linearization tolerance, feed control at the tool centre, etc. The post-processor in output gives a file called "NC file", usually recorded on a magnetic means.

All these operations usually take place in the data processing center, while the following ones are carried out in the workshop where the machine tool is placed.

Once the NC file of the machine tool has been loaded, the parameters for checking the remaining freedoms (compensation, tool diameter and length, feed alteration and spindle rate, symetry, piece slot, etc.) shall be set; after these operations, the machining can be started.

It is clear that applying the abovementioned procedure costs a lot of money and takes a lot of time.

Several equipments and skilled workers are necessary and the machining times become very long, too.

That is why, in this field there is the need for a device, that is a kind of tridimensional plotter able to automatically carry out all the above operations.

A device like that, which shall be used in a technical office, shall be of limited dimensions, but will have a ratio between the volume of the piece to be machined and the outer volume of the machine apt to allow the production of models having dimensions not too limited and however comparable with the real ones. Moreover it shall be easy to use, so that it can be used also by technicians without a specific training in the field, nevertheless it shall be capable of carrying out every kind of required machinings with high accuracy so as to allow the use of the product, which can be a model or a surface file, even for mass production with no need for further operations, data reprocessing, etc.

Therefore, it is clear that the realization of a device like that can solve some serious technical problems in the production of both the mechanical and the electronic part of the machine.

The device shall be able to carry out machinings with tolerances of a few hundredths of a millimeter, which brings about the necessity for a rigid structure able to take up—without strains—the reactions transmitted by the tool during the machining and the consequently high accelerations (up to 0.5 G) given to the tool support during its shiftings.

This characteristic does not help in meeting the requirement of a light and solid structure to be placed in an office together with the necessary cabinet and soundproofing system.

Furthermore the piece insertion shall be easy to carry out, even when the available space is poor.

Moreover the machine, in order to be really practical, shall be easy to use even for unskilled personnel, so as to avoid several intermediate steps in the processing of the surface file, which now requires the participation of skilled technicians.

Even as far as the parameters to be given to the machine during the different phases of the processing cycle are concerned, it is necessary for this operation to be as simple as possible.

The problem is then worsened by the fact that, unlike the bidimensional plotters in which the tool position—in this case a pen point—is defined through just two Cartesian coordinates, in a 3D plotter it is necessary to define both the tool position in the space—by means of three Cartesian coordinates—and its orientation, by means of direction cosines of the normal to the surface.

Besides the abovementioned ones, there are also other parameters intervening according to the kind of machining to be carried out and to the used tool; these parameters will be later specifically discussed in the description of the electronic part of the machine.

From the foregoing, it is clear that the problem is rather complicated.

BRIEF DESCRIPTION OF THE DRAWINGS

This and other problems can be solved by the plotter of the invention, which will now be described in detail by giving a nonlimiting example with reference to the enclosed figures in which.

DESCRIPTION OF THE PREFERRED EMBODIMENT

Figure 1:
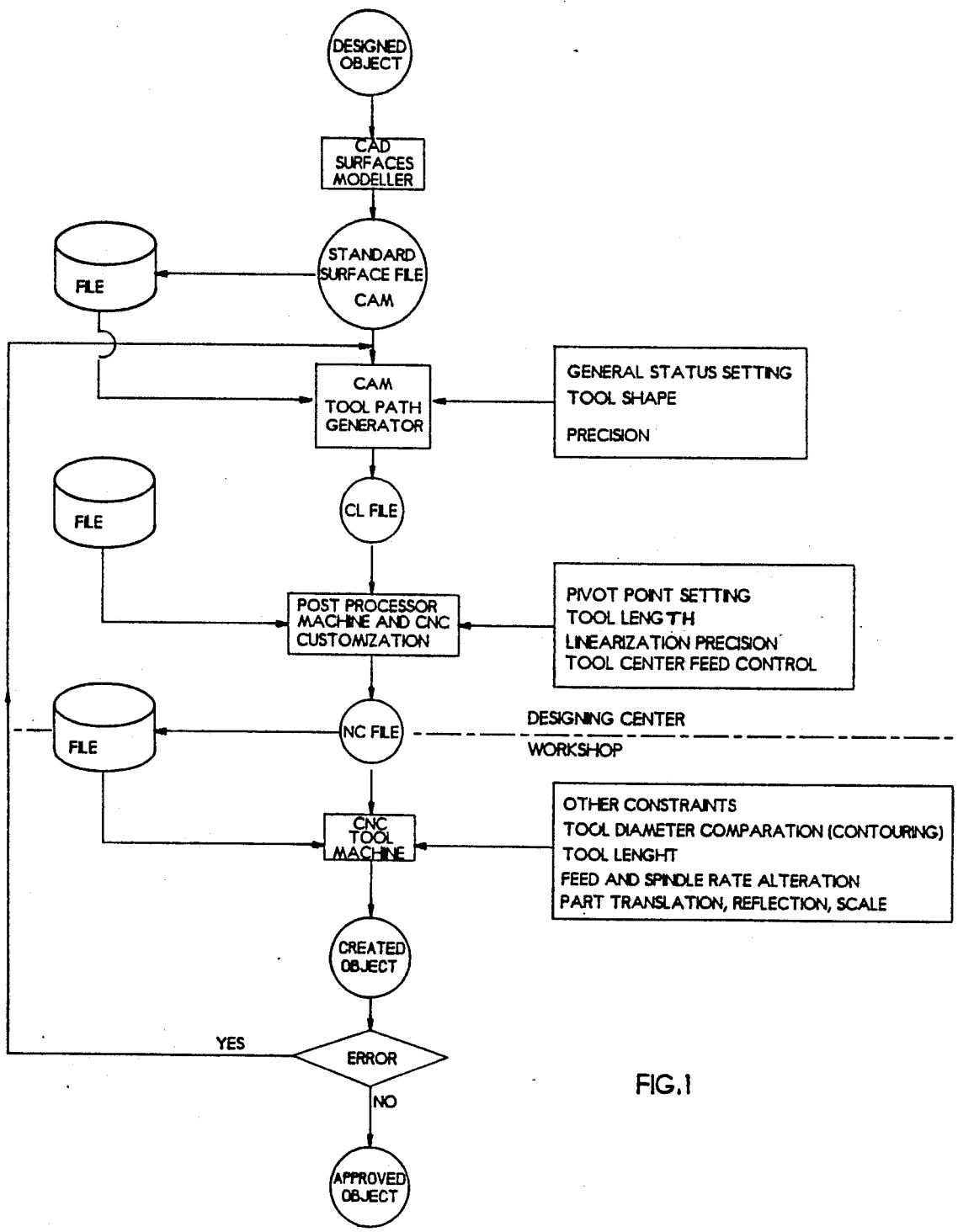
FIG. 1 is a flowchart illustrating the process for using the invention.
Figure 2:
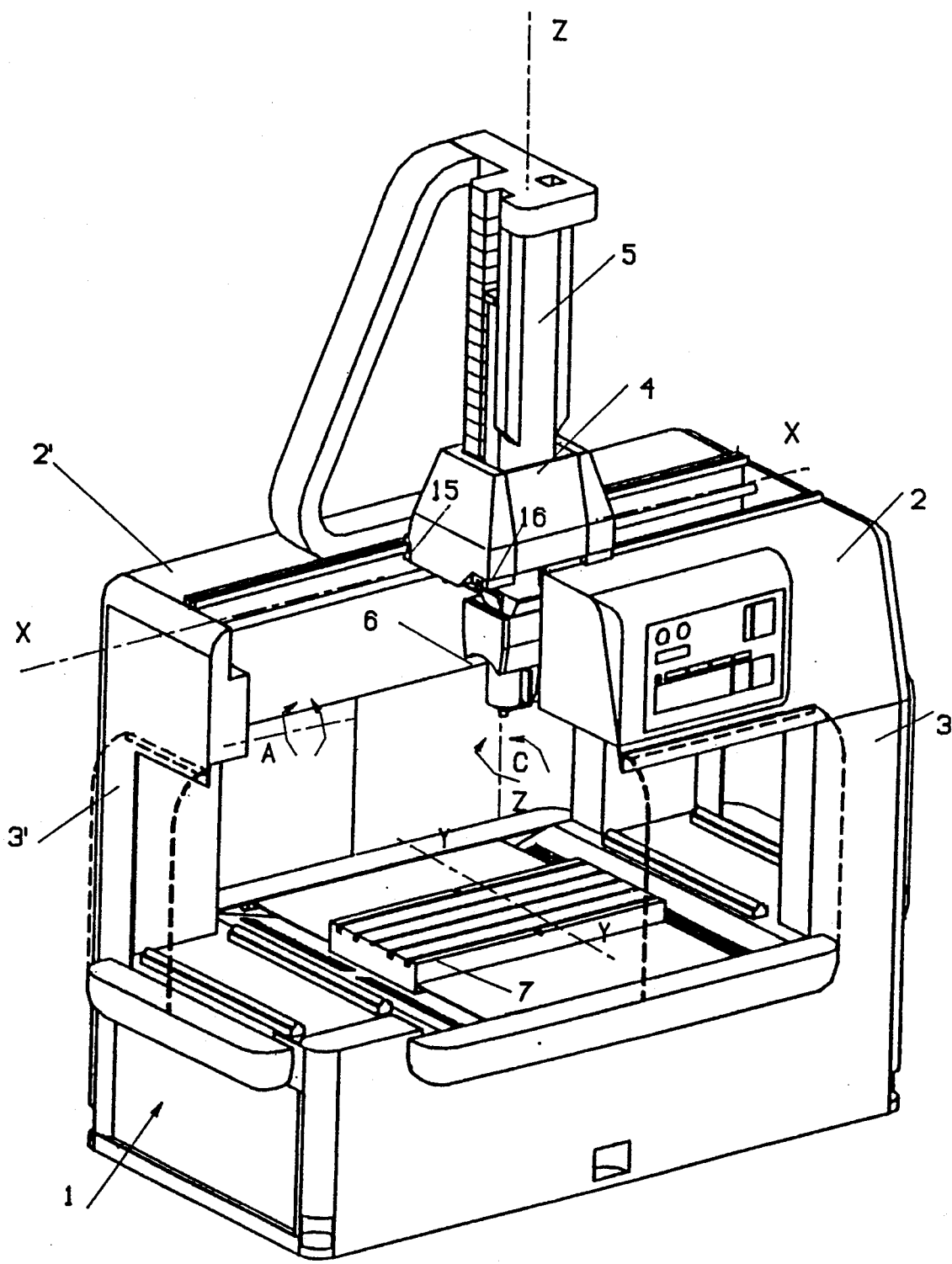
FIG. 2 is an overall view of the plotter.

With reference to FIG. 2, the plotter in accordance with the invention consists of a base 1 on which there are two parallel portal structures or beams 2 and 2' supported by four uprights 3 placed at the machine corners.

A cross support 4 of a sleeve 5 is supported on the two beams and slides on them.

At the lowest extremity of the sleeve 5, which vertically slides inside the cross support, there is a head 6 having 2 degrees of freedom. In this way the head 6 moves on the plane XZ between the uprights 3 along axis X and between the beams 2 and a piece-holding table 7 along the axis Z.

The piece-holding table 7 moves in a direction orthogonal to the axes X and Z (Y axis) and is the last one of the three movement orthogonal axes.

Besides the abovementioned working axes X, Y and Z there are the polar axes A and C the head 6 is provided with, making a total amount of five degrees of freedom. This overall configuration gives remarkable advantages: by making the head 6 slide in the space between a couple of box beams 2 and 2' it is possible to limit the structure dimensions giving at the same time the max. stiffness.

Moreover it is possible to place the head support at a lower height, thus lowering the application point of the reaction forces applied to the structure when the machine is working, with a resulting decrease of the strains.

Thanks to the abovementioned characteristics, it is possible for a compact machine to have an inner machining area having dimensions near to those of the machine itself.

This utmost compactness is also reached thanks to the fact of providing the head 6 holding a cantilevered spindle instead of a fork-mounted spindle, which causes a further reduction of the necessary space.

Figure 4:
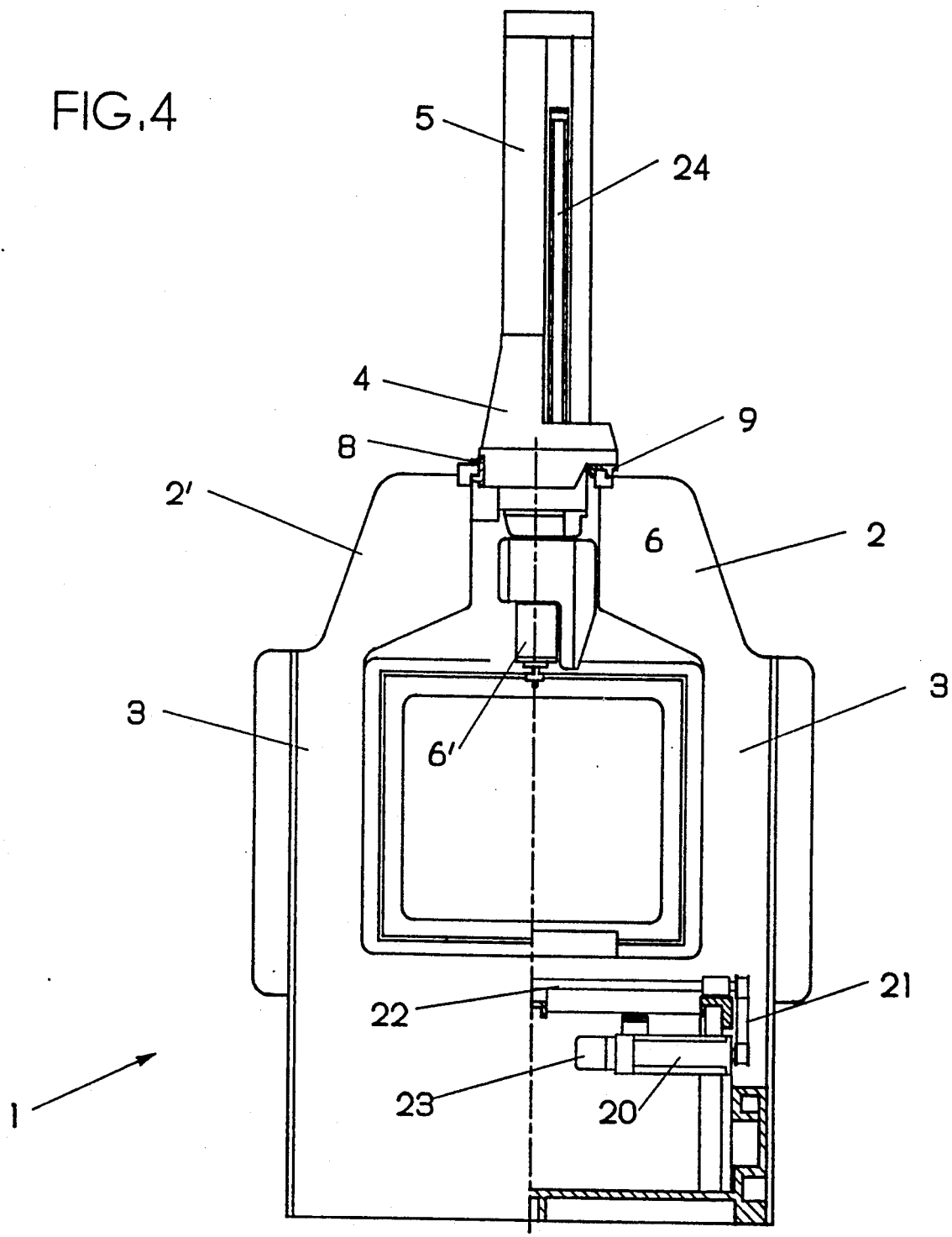
FIG. 4 is a side partially sectional view of the machine.

In FIG. 4, 6' is an electrospindle mounted on the head 6.

Figure 9:
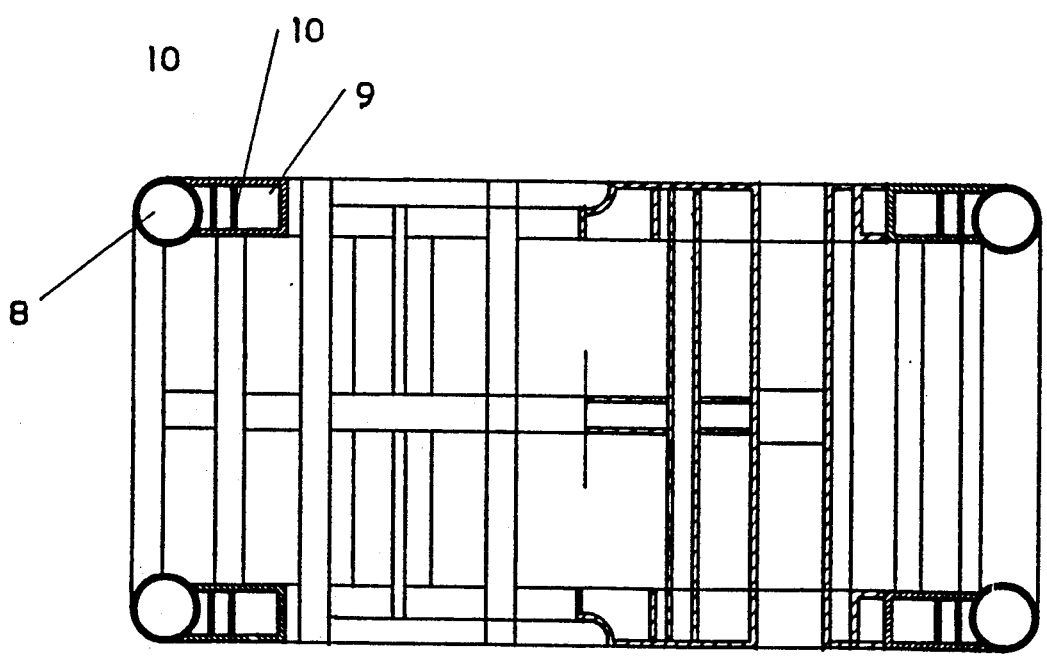
FIG. 9 is the horizontal section of the machine base.
Figure 7:
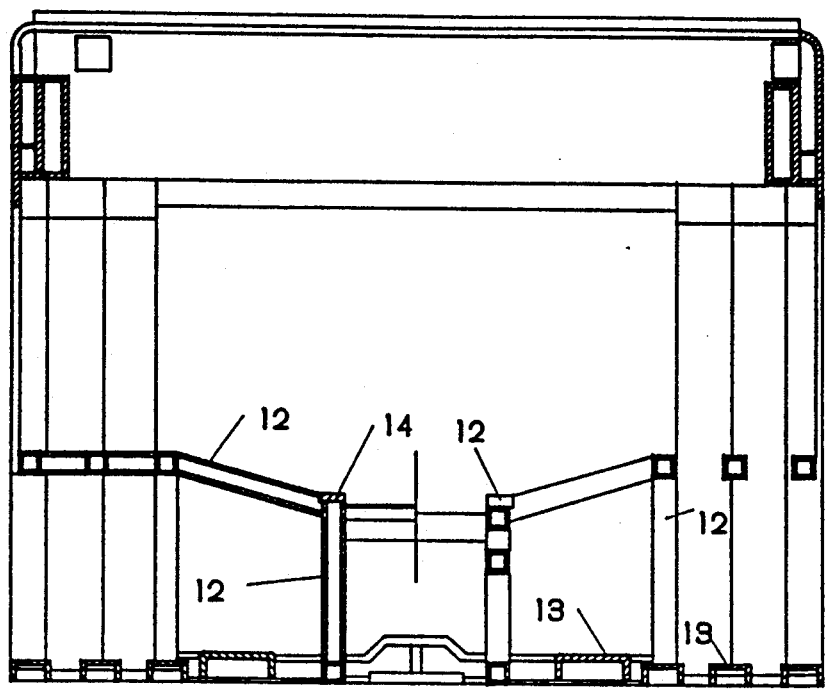
FIG. 7 is a vertical section of the plotter.
Figure 8:
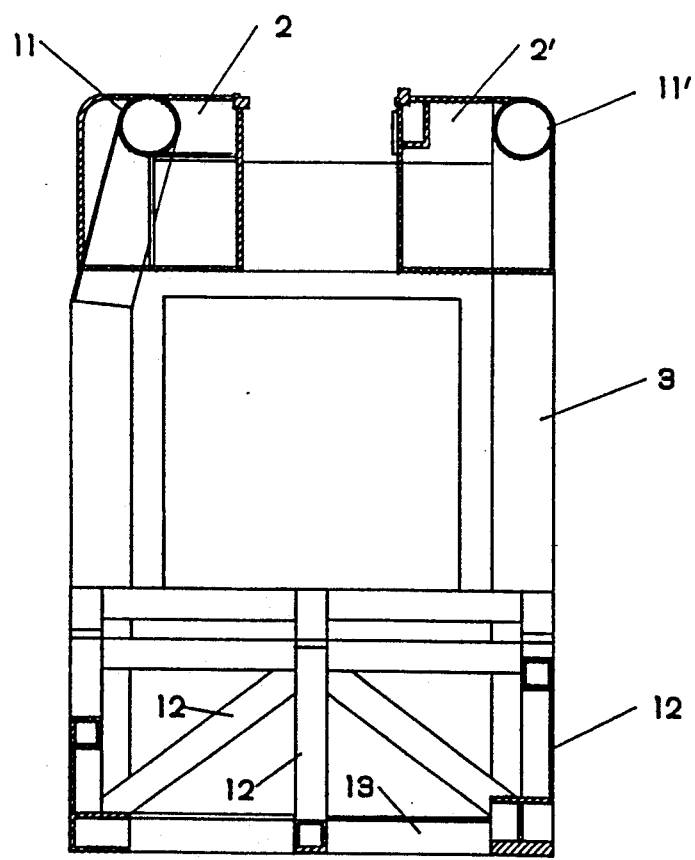
FIG. 8 is a vertical section with reference to a plane orthogonal to that of FIG. 7.
Figure 10:
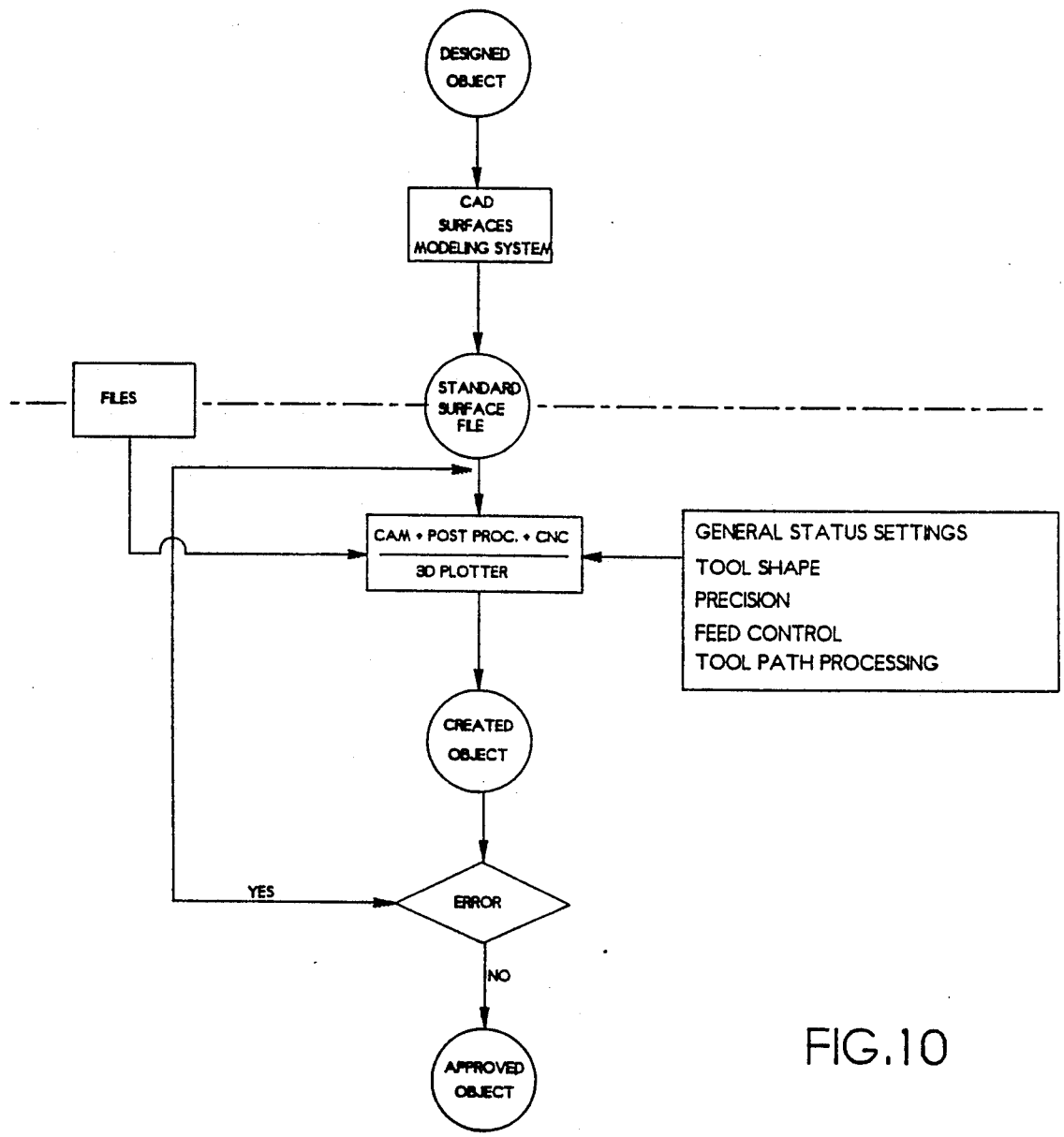
FIG. 10 is the block diagram of the machine control devices.

The FIGS. 7, 8 and 9 show the composition of the plotter structure.

The uprights 3 consist of a round tube 8 and of a square tube 9 linked to a sheet 10 connected through seam welding (FIG. 9).

In the upper part (FIG. 8), the tubes couples 8 connect to similar tubes 11 and 11' being the edges of the beams 2 and 2'.

In the lower part a trestlework consisting of square tubes 12 welded to basis section bars 13 (FIG. 7) acts as support for the mobile table 7, which slides along two recirculating ball guides on a framework 27 (FIG. 3) fixed to the base 1 through the supports 14 (FIG. 7).

Figure 3:
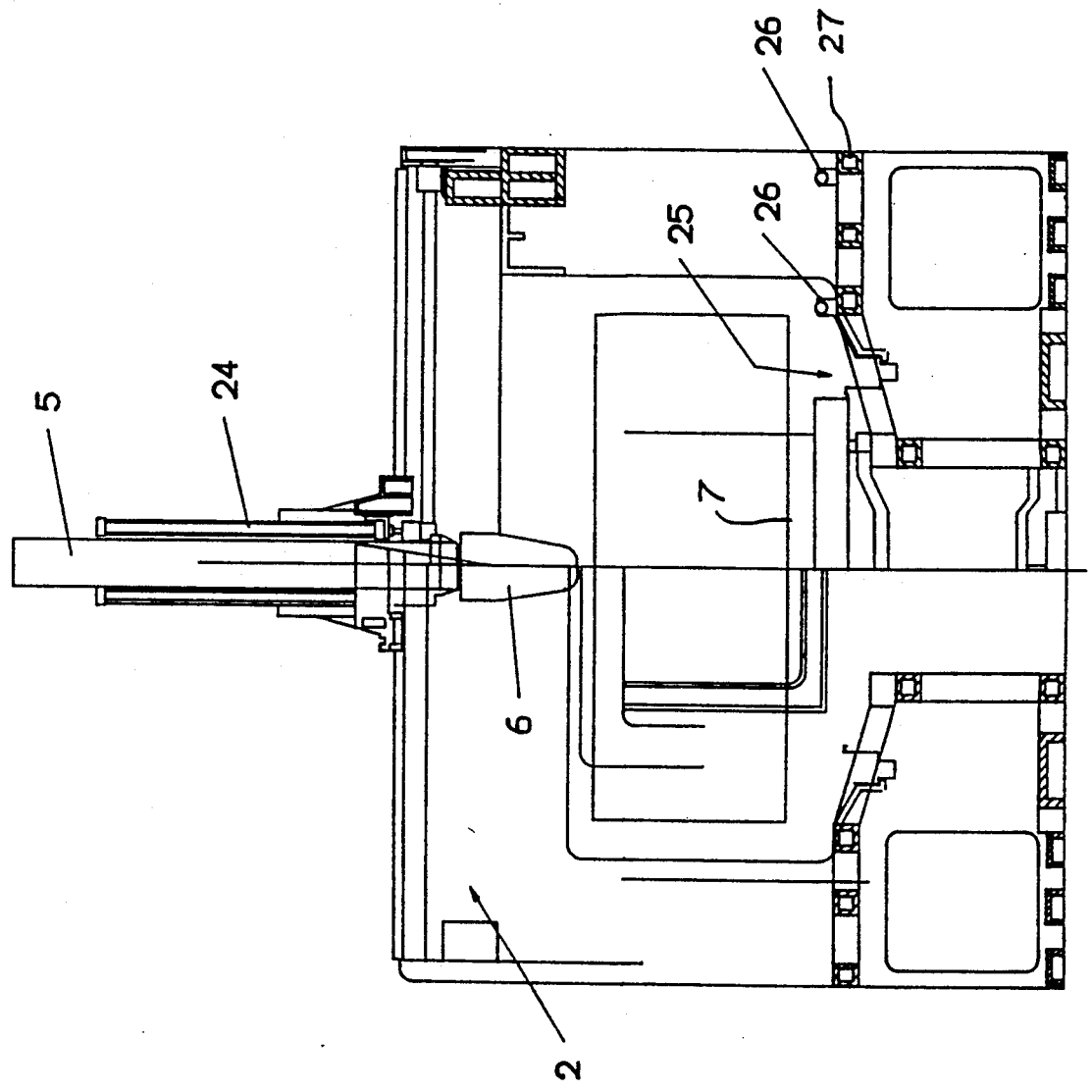
FIG. 3 is a front partially sectional view of the plotter of the invention.

The trestlework defines the spaces for the electronic part and for the control systems of the machine (FIG. 3).

In this structure the cross support 4 moves along the beams 2 and 2' sliding on a couple of prismatic ball guides by means of as many couples of sliding-blocks indicated with 15 and 16 respectively, the former placed on a vertical plane and the other on a horizontal plane thus allowing an easier adjustment of the cross support, for example by means of micrometer screws or the like.

Figure 5:
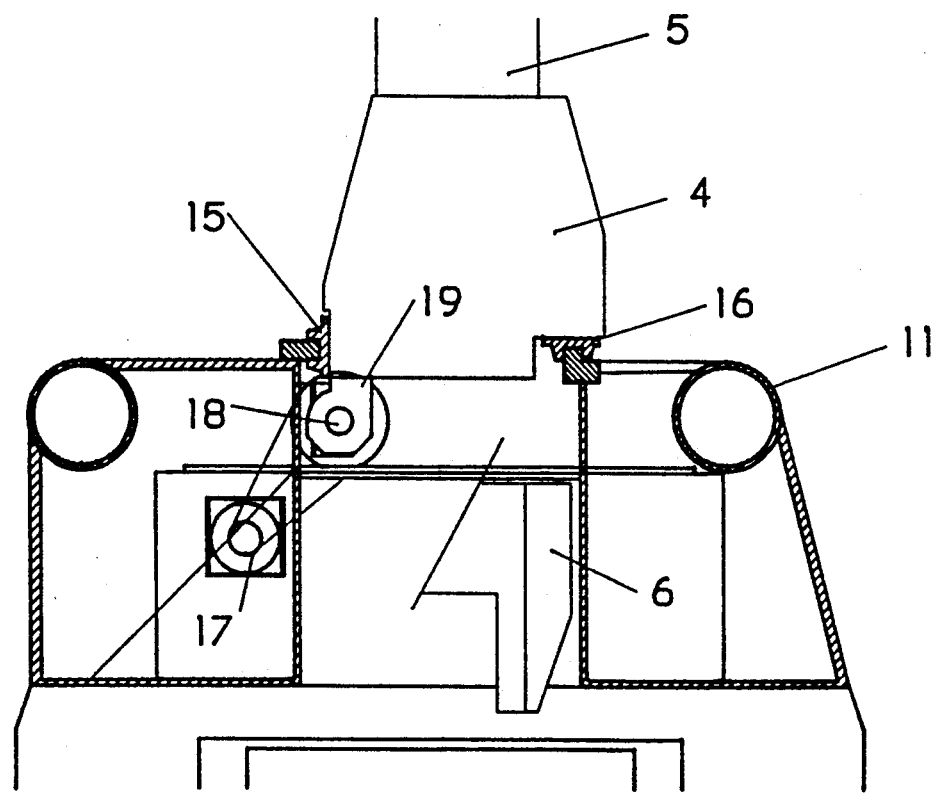
FIG. 5 is a magnified detail of FIG. 4.
Figure 6:
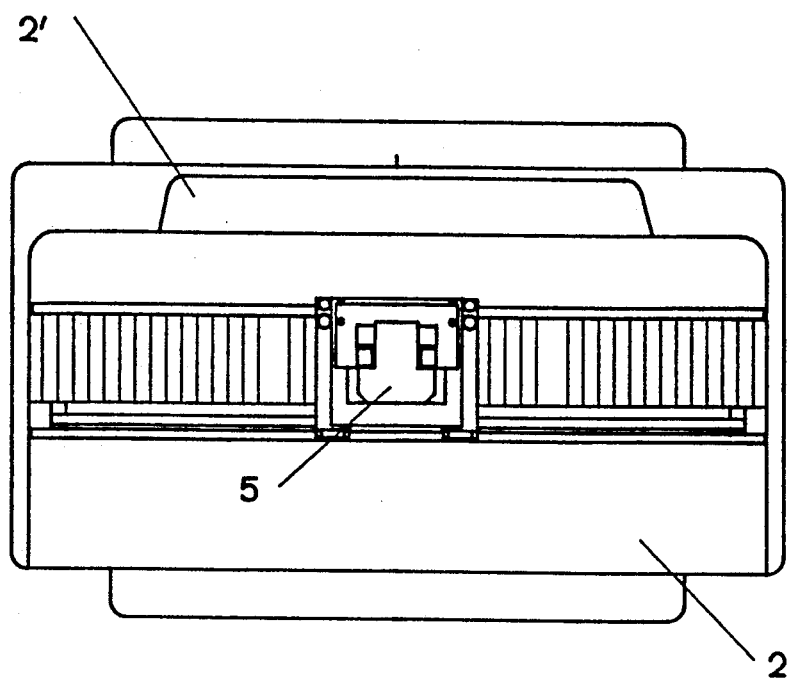
FIG. 6 is the plotter plan view.

The shifts of the support 4 with the head 6 along the X axis are controlled by a D.C. motor 17 operating a ball screw 18, which engages a slider 19 integral with the support 4 (FIG. 5). An encoder, not shown, takes these movements.

Even the movements of the axes Y and Z (piece-holding table and sleeve) of the machine are obtained through recirculating ball screws and motors and detected by as many encoders.

In FIG. 4 the number 20 is the motor controlling the shifting of the piece-holding table 7 along the axis Y, by transmitting the motion through a belt 21 to a recirculating ball screw 22 connected to the table 7.

An encoder or detecting cell 23 is connected to, and is in line with the motor 20, a solution common to detecting systems of the axes X, Y and C. A couple of pneumatic cylinders 24 (FIG. 3) are placed beside the sleeve 5 to give a thrust upwards able to counterbalance the weight of the sleeve.

Openings 25 for dust suction are in the base near the plane 7.

As the beams 2 are supported by 4 uprights placed at the machine corners, it is possible to enter the machine from all four sides, thus making the loading of the pieces to be machined easier, even if of big dimensions.

To this aim, near the edges of the plane 7 and at the same height, there are the rolls 26.

As said before, in the plotter according to the invention, the post-processor processing the file of data coming from the CAD is integrated with other electronic control devices of the machine. This subject needs further precise information.

Usually downstream the CAD system there is a CAM system producing a file (CL file) which is then translated by a post-processor in order to obtain a working file (NC-file). This, once transferred to the machine tool, controls its operation.

Once the CAM has a surface available (e.g. imported from the CAD using the Bezier Poles or the multinomial coefficients, etc.) it is necessary to define the procedure for generating the tool trajectories.

In order to obtain the tool center movements, it is necessary to previously set compulsory paths on the surface (e.g. isoparametric lines) for the tangency point between tool and piece and then, taking into account the tool axis orientation, the positioning is fully determined by the tangency condition; as an alternative it is possible to bind directly in a partial way the movement of the tool centre by keeping a residual degree of freedom allowing the tangency condition in an unset point between tool and piece (as in the case of milling for parallel planes).

Then it is necessary to code—by means of a proper transducer (post-processor)—the calculated paths in a format understandable by the machine controller.

The present calculation method of the machining paths in CAM brings about the necessity of coming back to the data processing centre to correct the programs which have shown NC programming errors in the machine. The result is an unconfortable two-way information flow between two systems which are logically and physically separated. The flexibility of the segmented paths is scanty, since a programm for the production of a standard piece is indissolubly linked to the use of a particular tool and by the dimensional accuracy required by the CAM system. Finally, the quantity of information contained in a NC-file is usually far higher than that being sufficient to define the machined surface. All these circumstances prevent the creation of piece-programs archives at the machine.

In the plotter according to the invention a local subsystem is provided including a non-linear interpolator able to create trajectories and paths with compensation of the tool dimensions, which works the surfaces in standard format taking into account a set of simple guidelines defined at the moment of the execution and directly controls the addresses of the machine axes.

As a consequence the CAM processing steps, the post-processing and the NC-file interpretation are gathered in just one phase by the machine controller.

There is the possibility of managing archives of compact and flexible information for the immediate execution of inventory pieces and, moreover, of carrying out modifications, geometrical parametrizations, etc. by means of utility programs implemented on the machine.

The system is able to process traditional NC files, which can be even produced in site for later execution when the performances of the whole machine-control are to be fully exploited by eliminating complicated calculations in real time.

The technician shall just tranfer the surface file created by CAD in the 3D plotter in accordance with the invention and set in the machine the values necessary to obtain the model.

Figure 11:
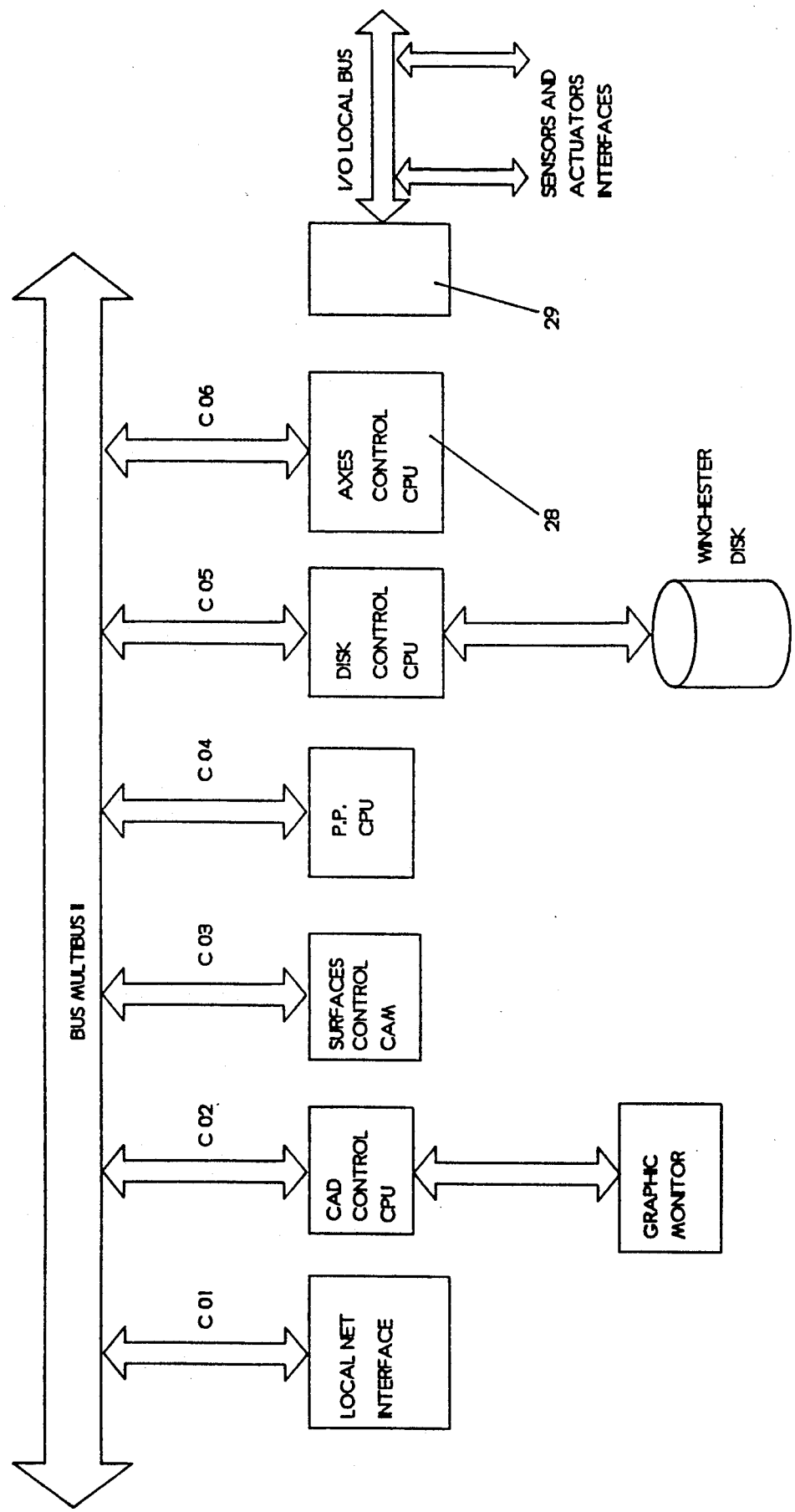
FIGS. 11 and 12 are block diagrams of the hardware structure of the plotter; and figures from 13 to 15 show the operating diagrams of the linear interpolator, of the control loop and of the axes control CPU.
Figure 12:
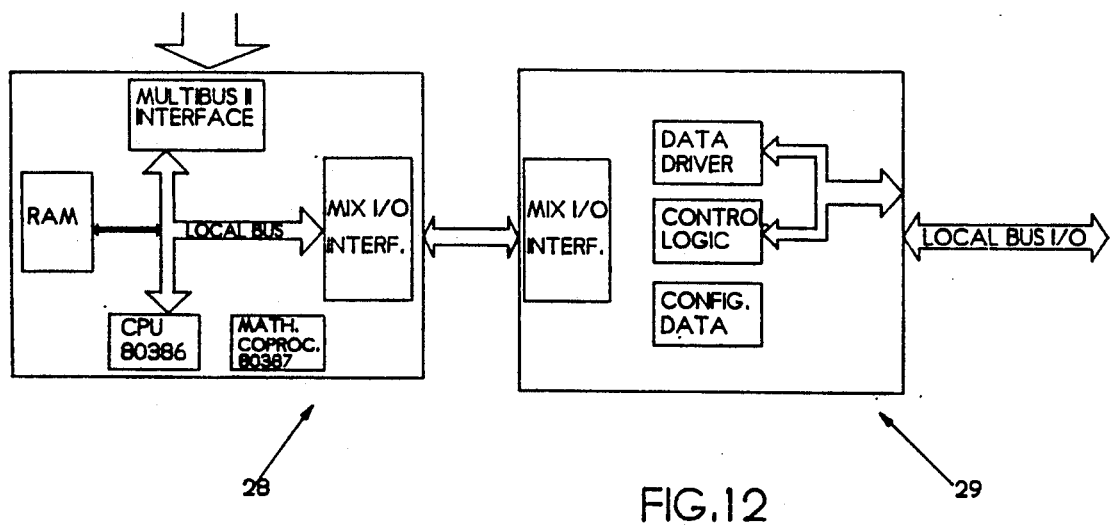

FIGS. 11 and 12 show the block diagrams of the hardware structure of the machine control unit.

Characteristic of the system is the standard MULTIBUS II, which is a BUS architecture independent of the processor, with a parallel system 32 Bit BUS, local store BUS and I/O expansion BUS.

This structure with multiple BUSes gives the advantage that every BUS is optimized for a specific function and that different BUSes can carry out parallel operations, thus increasing the processing speed.

The connections C01 . . . C06 allow the access to the MULTIBUS of as many CPUS, in order to carry out the listed activities.

In particular the I/O expansion BUS connects the interface cards with the sensors and the actuators present on the machine. The connection between the I/O EXPANSION BUS and the AXES CONTROL CPU is shown in detail in FIG. 12.

Element 28 is a card having the AXES CONTROL CPU, consisting of a connection interface to MULTIBUS II and a local BUS connecting such interface to the processing CPU and to a I/0 MIX interface. The I/O MIX interface is linked to a similar I/O MIX interface present on a card 29 and linked to a DATA DRIVER, a CONTROL LOGIC and a memory labeled Config. Data The DATA DRIVER is made of a series of logical gates in order to uncouple the processing of signals coming from the interface I/O MIX, with the LOCAL BUS TOWARDS THE FIELD.

The CONTROL LOGIC is a control logic of Data Drivers and of the LOCAL BUS TOWARDS THE FIELD; it defines the timing for the synchronization between the signals created by the I/O MIX BUS and going to the LOCAL BUS TOWARDS THE FIELD.

The store 30 is a RAM non-volatile memory containing information about the personalization for the interface card configuration. The AXES CONTROL CPU obtains from the temporary file created by the Post-Processor CPU, the movement blocks given with reference to the coordinates of the milling cutter center and of the orientation of the operating head. By means of the abovementioned information the linear interpolator is steered, thus producing the data to be supplied to the Control Loop.

The task of the linear interpolator is to generate, for each sampling interval, the increase in space and the relevant speed, starting from initial and final positions and orientations of the operating head, so as to be able to steer the machine "axes interlockings". The operating diagramm of the linear interpolator is given in the blocks diagramm shown in FIG. 12. The linear interpolator is activated at each sampling interval of the system and, after calculating the new position as well as the new speed, it activates the CONTROL LOOP.

The task of the CONTROL LOOP is to maintain the real position of the machine as near as possible to the theoretical position generated by the interpolator.

Figure 13:
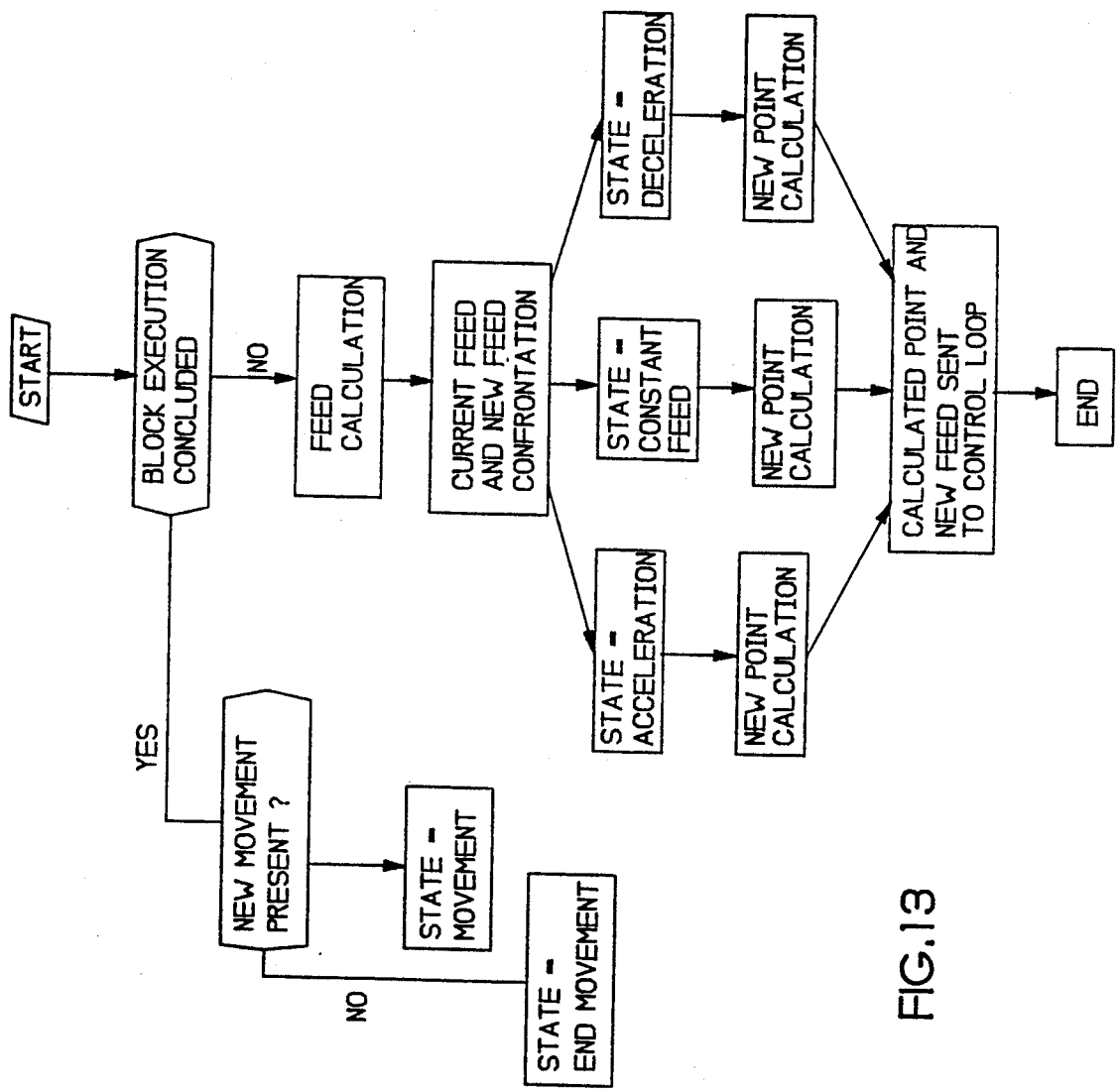
Figure 15:
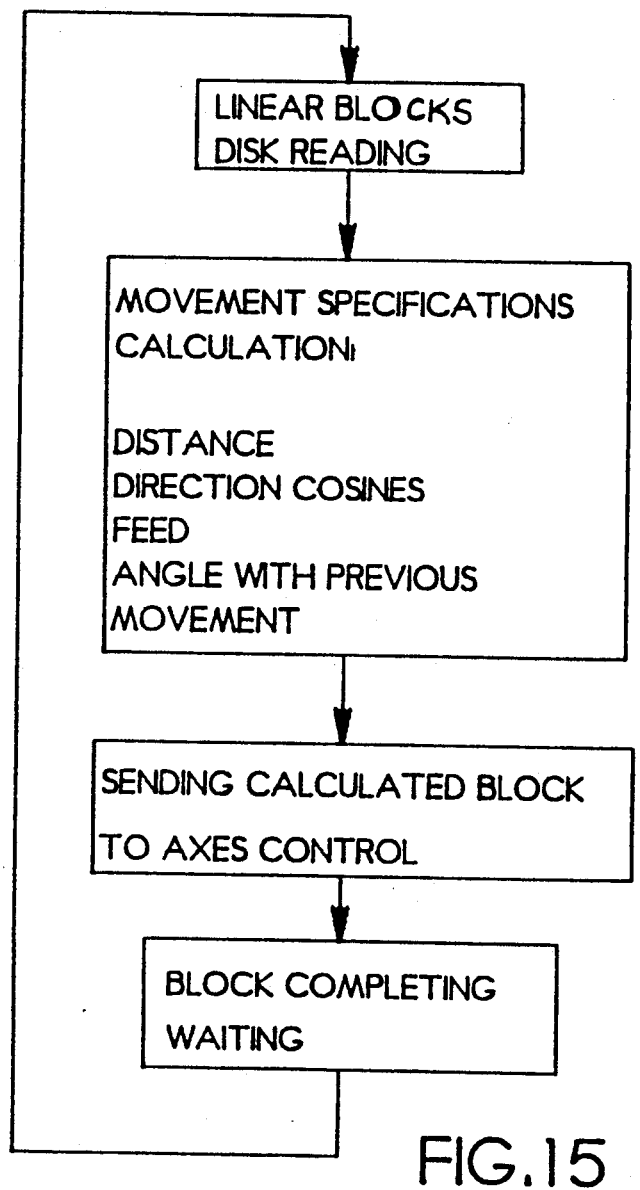

To this aim, after each system sampling interval the axes values are read and compared with the theoretical position value calculated by the interpolator. The result of such comparison, changed into an analog signal, is supplied to the axes interlockings. The operating scheme is shown in FIG. 13.

Figure 14:
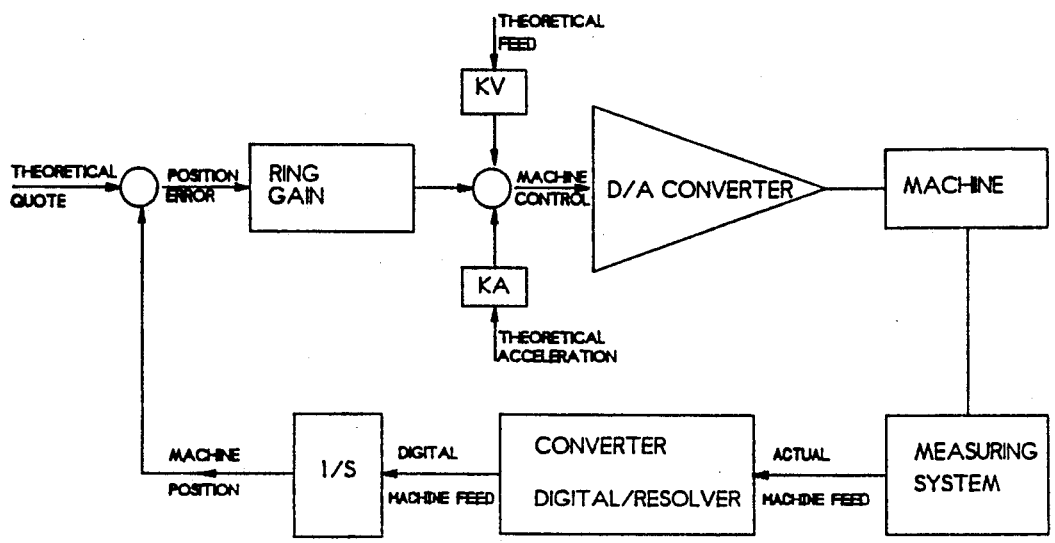

The AXES CONTROL CPU receives the file containing the linear blocks generated by the SURFACES MANAGING CPU and carries them out, by controlling at the same time the machine axes, in compliance with the scheme given in FIG. 14.

A technician expert in this field will be then able to design several modifications and changes, which shall be deemed as falling within the scope of this invention.

I claim:

1. A tridimensional plotter for making a model of a CAD surface file, the plotter, comprising: an operating head for carrying an interchangeable tool having a known shape; a support for movably carrying the head; means for mounting the support for movement of the support along a first horizontal axis (x); a sleeve mounted for movement along a vertical axis (z) to the support, the head being connected for movement to the sleeve, the means for mounting the support comprising a horizontal guide, the support being mounted for horizontal movement along the horizontal guide, the horizontal guide comprising a pair of spaced apart beams, a machine framework for supporting the pair of beams, the support being mounted for horizontal movement between and along the beams; a table mounted for movement along a second horizontal axis (y) which is perpendicular to the first horizontal axis of movement of the support, the table being mounted to the framework, a plurality of electronic devices for controlling movements of the head on the sleeve, for movement of the sleeve on the support, for movements of the support along the pair of beams and for movement of the table on the framework; and a data processing unit integrated into the electronic devices for processing a CAD surface file to produce an NC file for operating the electronic devices; the NC file containing data for moving the head, sleeve, support and table, and the data processing unit being connected to the electronic devices for moving the head, sleeve, support and table according to the NC file; the data processing unit also including non-linear interpolation means for creating trajectories and paths of movement for the head, sleeve, support and table, in the NC file, which compensate for the tool shape to form an accurate model.

2. A tridimensional plotter according to claim 1, wherein said framework comprises a plurality of uprights extending vertically and defining an internal machine space for receiving a workpiece.

3. A tridimensional plotter according to claim 2, wherein said means for mounting the support, including the beams and framework are box-shaped for receiving a workpiece.

* * * * *